United States Patent
Fujino et al.

(10) Patent No.: US 7,805,215 B2
(45) Date of Patent: Sep. 28, 2010

(54) PROGRAMMING DEVICE AND PROGRAMMING METHOD

(75) Inventors: Daisuke Fujino, Tokyo (JP); Kenji Iriguchi, Tokyo (JP); Nobuyuki Takahashi, Tokyo (JP); Katsunori Tanaka, Tokyo (JP); Yuka Mitani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 780 days.

(21) Appl. No.: 11/792,340

(22) PCT Filed: Aug. 1, 2006

(86) PCT No.: PCT/JP2006/315210

§ 371 (c)(1),
(2), (4) Date: Jun. 5, 2007

(87) PCT Pub. No.: WO2008/015737

PCT Pub. Date: Feb. 7, 2008

(65) Prior Publication Data

US 2009/0228130 A1    Sep. 10, 2009

(51) Int. Cl.
*G06F 19/00* (2006.01)
(52) U.S. Cl. .............. 700/182; 700/181; 700/173; 700/118; 700/186
(58) Field of Classification Search ............ None
See application file for complete search history.

(56) References Cited

U.S. PATENT DOCUMENTS

| | | | | |
|---|---|---|---|---|
| 5,815,400 A | * | 9/1998 | Hirai et al. ............. | 700/173 |
| 5,827,020 A | * | 10/1998 | Fujita et al. ............. | 409/80 |
| 6,675,060 B1 | | 1/2004 | Matsubara et al. | |
| 6,850,814 B2 | | 2/2005 | Kamiya | |
| 6,862,493 B2 | | 3/2005 | Matsubara et al. | |
| 7,243,000 B2 | * | 7/2007 | Ohashi et al. ............. | 700/183 |
| 7,487,005 B2 | * | 2/2009 | Kakino et al. ............. | 700/179 |
| 2006/0089746 A1 | * | 4/2006 | Kakino et al. ............. | 700/179 |
| 2006/0142892 A1 | * | 6/2006 | Ohashi et al. ............. | 700/173 |

FOREIGN PATENT DOCUMENTS

| | | |
|---|---|---|
| JP | 5-20402 A | 1/1993 |
| JP | 7-214457 A | 8/1995 |
| JP | 8-263124 A | 10/1996 |
| JP | 2001-62674 A | 3/2001 |
| JP | 2001-121383 A | 5/2001 |
| JP | 2003-241809 A | 8/2003 |
| TW | 411408 B | 11/2000 |

OTHER PUBLICATIONS

Taiwan Office Action dated Aug. 28, 2009.

* cited by examiner

*Primary Examiner*—Albert DeCady
*Assistant Examiner*—Douglas S Lee
(74) *Attorney, Agent, or Firm*—Sughrue Mion, PLLC (57) ABSTRACT

A programming device programs a machining control program to be used on a numerical control device for machining an object. A setting unit sets an axial direction of the tool with respect to the data on the machining-target area and sets a deepest position of a tip of the tool with respect to the data on the machining-target area. An extracting unit extracts a surface-machining-target area of the object from the data on the machining-target area based on the set axial direction of the tool, the set deepest position of the tip, and the data on the machining-target area.

6 Claims, 10 Drawing Sheets

MATERIAL SHAPE
M1

FIG.4

PRODUCT SHAPE
M2

FIG.5

MACHINING-TARGETING AREA SHAPE M3

FIG.6

TOOL-AXIAL DIRECTION V1
SURFACE F1
PRODUCT SHAPE M2

SURFACE-MACHINING-
TARGET AREA SHAPE
M7

FIG.16

NEW MACHINING-
TARGET AREA SHAPE
M8

PRODUCT SHAPE
M2

PROGRAMMING DEVICE AND PROGRAMMING METHOD

TECHNICAL FIELD

The present invention relates to a programming device that programs a numerical control (NC) program and a method of programming.

BACKGROUND ART

Recently there has been promoted development of a technique for machining a product (a machining-target object) into a complex shape by using an NC program on a machining device. The NC program, however, needs to be programmed beforehand so that a user (e.g., an operator) of the machinery can easily machine the product.

In a conventional system for programming NC programs based on CAD (Computer Aided Design) data, when an NC program for surface machining such as slicing or pocket milling is to be programmed, a machining-target-area defining unit included in a computer aided manufacturing (CAM) system defines a machining-target area by selecting/extracting a shape that prescribes the machining-target area from shape data that is created by a CAD system, and an NC-program programming unit programs an NC program by adding machining conditions to data on the defined machining-target area (for example, see Patent Document 1).

Patent Document 1: Japanese Patent Laid-open No. H05-20402 (pages 2 to 4, FIG. 1)

DISCLOSURE OF INVENTION

Problem to be Solved by the Invention

As the shape of the machining-target area to be extracted becomes more complex, it becomes necessary to give more instructions for selecting the shape that prescribes the machining-target area, which leads to a problem of an increase in the workload for the process of selecting/extracting the shape that prescribes the machining-target area. Moreover, when defining a plurality of machining-target areas that require changing an axial direction of a tool, the operator needs to add shape data and select an appropriate shape from the shape data so that shapes of the machining-target areas can be defined without causing interference with a shape of a product and also with reducing waste of the workload. This method leads to a problem of an increase in the workload of the operator, and requires the operator to have high-level technical skills.

In consideration of the above problems, an object of the present invention is to provide a programming device that can easily program an NC program for machining a plurality of surfaces by changing the axial direction of the tool with simplified instructions and a method of programming the NC program.

Means for Solving Problem

To solve the problem and achieve the object as described above, the present invention provides a programming device that programs a machining control program that is used when a numerical control device performs machining control of a machining-target object by changing an axial direction of a tool. The programming device includes a machining-target-area data storage unit that stores therein data on a machining-target area of the machining-target object, a tool-axial-direction setting unit that sets an axial direction of the tool with respect to the data on the machining-target area stored in the machining-target-area data storage unit based on data input from outside when the machining-target object is to be surface-machined, a tool-deepest-position setting unit that sets a deepest position of a tip of the tool with respect to the data on the machining-target area stored in the machining-target-area data storage unit based on data input from outside when the machining-target object is to be surface-machined, a surface-machining-target-area extracting unit that extracts a surface-machining-target area of the machining-target object as data on the surface-machining-target area from the data on the machining-target area based on the axial direction of the tool set by the tool-axial-direction setting unit, the deepest position of the tip of the tool set by the tool-deepest-position setting unit, and the data on the machining-target area stored in the machining-target-area data storage unit, a machining-process-data determining unit that determines data on machining processes for surface-machining the machining-target object based on the data on the surface-machining-target area extracted by the surface-machining-target-area extracting unit, and a programming unit that programs a machining control program that complies with the data on the surface-machining-target area extracted by the surface-machining-target-area extracting unit and the data on the machining processes determined by the machining-process-data determining unit. The surface-machining-target-area extracting unit extracts a maximal area that can be machined without causing interference with the machining-target object as the data on the surface-machining-target area when the machining-target object is surface-machined to the deepest position of the tip of the tool set by the tool-deepest-position setting unit in the axial direction of the tool set by the tool-axial-direction setting unit.

EFFECT OF THE INVENTION

According to the invention, it is possible to extract a maximal area that can be machined without causing interference with the machining-target object based on simplified external input data. Thus, a program can be easily programmed with simplified instructions.

EXPLANATIONS OF LETTERS OR NUMERALS

1 Programming device
2 Shape-data input unit
3 Product-shape storage unit
4 Material-shape storage unit
5 Machining-target-area-shape creating unit
6 Machining-target-area-shape storage unit
7 Tool-axial-direction setting unit
8 Tool-axial-direction storage unit
9 Tool-tip-deepest-position setting unit
10 Tool-tip-deepest-position storage unit
11 Surface-machining-target-area-shape extracting unit
12 Surface-machining-target-area-shape storage unit
13 Machining-process-data determining unit
14 Machining-process-data storage unit
15 NC-program programming unit
16 NC-program storage unit
17 Machining-target-area-shape updating unit
18 Shape selecting unit
19 Tool-axial-direction selecting unit
20 Instruction input unit
30 CAD system
A1 Partial-product-shape projected area
E1 Line
F1, F2 Surface
M1 Material shape
M2 Product shape
M3 Machining-target area shape
M4 Partial product shape
M5 Partial machining-target area shape
M6 Tool-interfered area shape
M7, M9 Surface-machining target-area shape
M8 New machining-target area shape
P1, P2 Reference point
V1 to V3 Tool-axial direction
W1 Plane surface

BEST MODE(S) FOR CARRYING OUT THE INVENTION

Exemplary embodiments of a programming device and a programming method according to the present invention are explained in detail below with reference to the accompanying drawings. The present invention is not limited to the embodiments explained below.

Embodiment

Figure 1:
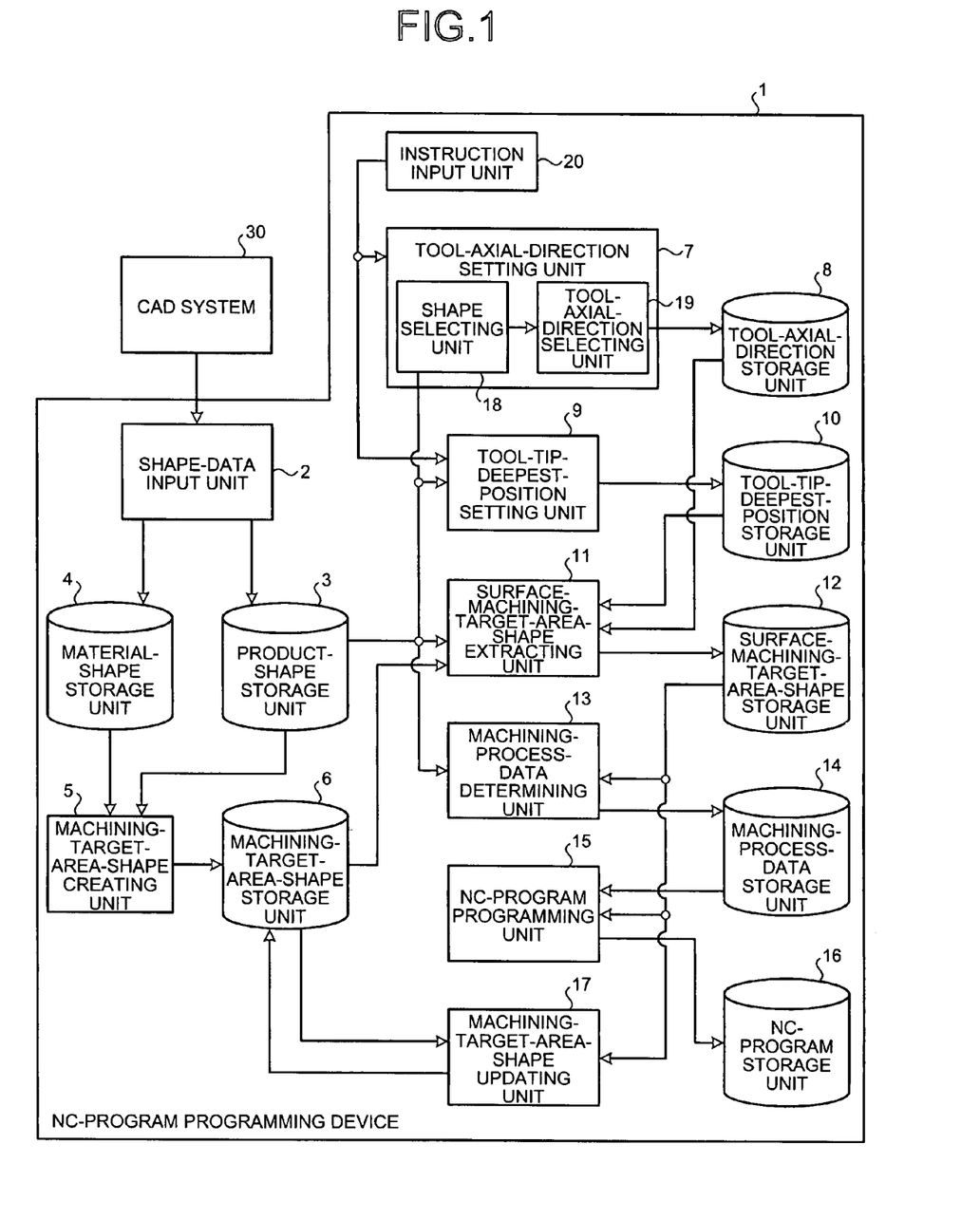
FIG. 1 is a block diagram of a configuration of an NC-program programming device according to an embodiment of the present invention.

FIG. 1 is a block diagram of a configuration of an NC-program programming device according to an embodiment of the present invention. An NC-program programming device 1 programs an NC program (a control machining program) for multi-surface machining in a plurality of directions while changing an axial direction of a tool. The NC-program programming device 1 includes, for example, a personal computer and the like. The NC program programmed by the NC-program programming device 1 is used, for example, by a numerical control device when controlling machining of a machining-target object.

The NC-program programming device 1 is connected to a CAD system 30. The NC-program programming device 1 includes a shape-data input unit 2, a product-shape storage unit 3, a material-shape storage unit 4, a machining-target-area-shape creating unit (a computing unit) 5, a machining-target-area-shape storage unit (a machining-target-area-data storage unit) 6, a tool-axial-direction setting unit 7, a tool-axial-direction storage unit 8, a tool-tip-deepest-position setting unit 9, a tool-tip-deepest-position storage unit 10, a surface-machining-target-area-shape extracting unit (a surface-machining-target-area extracting unit) 11, a surface-machining-target-area-shape storage unit 12, a machining-process-data determining unit 13, a machining-process-data storage unit 14, an NC-program programming unit (a programming unit) 15, an NC-program storage unit 16, a machining-target-area-shape updating unit (a machining-target-area updating unit) 17, a shape selecting unit 18, a tool-axial-direction selecting unit 19, and an instruction input unit 20.

The shape-data input unit 2 receives from the CAD system 30 three-dimensional shape data of a product (i.e., a final product of a machining-target object) (hereinafter, "product shape data") and three-dimensional shape data of a material (a material that is machined to obtain the product) (hereinafter, "material shape data"). The shape-data input unit 2 stores the product shape data transmitted from the CAD system 30 in the product-shape storage unit 3, and stores the material shape data transmitted from the CAD system 30 in the material-shape storage unit 4.

The product-shape storage unit 3 is a data storage (memorizing) unit that stores therein the product shape data input from the shape-data input unit 2. The material-shape storage unit 4 is a data storage unit that stores therein the material shape data input from the shape-data input unit 2.

The machining-target-area-shape creating unit 5 receives the product shape data and the material shape data from the product-shape storage unit 3 and the material-shape storage unit 4 respectively, and by using those data creates data on a machining-target area (shape) (hereinafter, "machining-target-area shape data"). Then, the machining-target-area-shape creating unit 5 stores the created machining-target-area shape data in the machining-target-area-shape storage unit 6. The machining-target-area-shape storage unit 6 is a data storage unit that stores therein the machining-target-area shape data created by the machining-target-area-shape creating unit 5.

The instruction input unit 20 is a data input unit, and includes a mouse or a keyboard. The instruction input unit 20 receives instructions from an operator (for example, data on an instruction for specifying a surface or a line of the product to determine an axial direction of the tool, or data on an instruction for specifying a point on the product) and the like. The instruction input unit 20 transmits the data on instructions received from the operator to the tool-axial-direction setting unit 7.

The tool-axial-direction setting unit 7 determines an axial direction of the tool (hereinafter, "a tool-axial direction") based on the data (the product shape data) stored in the product-shape storage unit 3 and the data on instructions from the instruction input unit 20 (the operator), and then stores the data on the determined tool-axial direction in the tool-axial-direction storage unit 8.

The tool-axial-direction setting unit 7 includes the shape selecting unit 18 and the tool-axial-direction selecting unit 19. The shape selecting unit 18 extracts data on a part such as a surface or a line (hereinafter, "product-shape part data") from the product shape data that is used to determine a tool-axial direction, and inputs the extracted product-shape part data to the tool-axial-direction selecting unit 19.

The tool-axial-direction selecting unit 19 determines a few prospective axial directions of the tool based on the product-shape part data input from the shape selecting unit 18, and displays those prospective axial directions of the tool on a display unit (not shown) or the like. The tool-axial-direction selecting unit 19 determines a certain tool direction from the prospective axial directions of the tool based on the data on the instruction from the instruction input unit 20 (i.e., an instruction for the tool-axial direction). Incidentally, the operator can input to the instruction input unit 20 an instruction that reverses the axial direction of the tool (an instruction for determining a reverse direction against the selected prospective axial direction of the tool as the tool-axial direction) input as the data on an instruction. The tool-axial-direction selecting unit 19 stores the data on the determined tool-axial direction as tool-axial direction data in the tool-axial-direction storage unit 8. The tool-axial-direction storage unit 8 is a data storage unit that stores therein the tool-axial direction data determined by the tool-axial-direction selecting unit 19.

The tool-tip-deepest-position setting unit 9 determines the deepest position to which the tip of the tool can reach (hereinafter, "a tool-tip deepest position") based on the product shape data stored in the product-shape storage unit 3 and the data on instructions (i.e., instructions from the operator) from the instruction input unit 20. Then, the tool-tip-deepest-position setting unit 9 stores the data on the determined tool-tip deepest position as tool-tip deepest position data in the tool-tip-deepest-position storage unit 10. The tool-tip-deepest-position storage unit 10 is a data storage unit that stores therein the tool-tip deepest position data determined by the tool-tip-deepest-position setting unit 9.

The surface-machining-target-area-shape extracting unit 11 receives the product shape data from the product-shape storage unit 3 and the machining-target-area shape data from the machining-target-area-shape storage unit 6. Furthermore, the surface-machining-target-area-shape extracting unit 11 receives the tool-axial direction data from the tool-axial-direction storage unit 8 and the tool-tip deepest position data from the tool-tip-deepest-position storage unit 10.

The surface-machining-target-area-shape extracting unit 11 extracts shape data on a machining-target area for actual surface machining (hereinafter, "a surface-machining target-area shape") by using the data received from the product-shape storage unit 3, the machining-target-area-shape storage unit 6, the tool-axial-direction storage unit 8, and the tool-tip-deepest-position storage unit 10. Then, the surface-machining-target-area-shape extracting unit 11 stores in the surface-machining-target-area-shape storage unit 12 the extracted data on the surface-machining target-area shape. The surface-machining-target-area-shape storage unit 12 is a data storage unit that stores therein the data on the surface-machining target-area shape extracted by the surface-machining-target-area-shape extracting unit 11.

The machining-process-data determining unit 13 receives the data on the surface-machining target-area shape from the surface-machining-target-area-shape storage unit 12, and determines data on machining processes such as a tool to be used and cutting conditions (hereinafter, "machining-process data"). The machining-process-data determining unit 13 stores the determined machining-process data in the machining-process-data storage unit 14. The machining-process-data storage unit 14 is a data storage unit that stores therein the machining-process data determined by the machining-process-data determining unit 13.

The NC-program programming unit 15 receives the data on the surface-machining target-area shape from the surface-machining-target-area-shape storage unit 12 and the machining-process data from the machining-process-data storage unit 14. The NC-program programming unit 15 programs an NC program based on the received data on the surface-machining target-area shape and the machining-process data. The NC-program programming unit 15 programs the NC program complies with the data on the surface-machining target-area shape and the machining-process data, and then stores the programmed NC program in the NC-program storage unit 16. The NC-program storage unit 16 is a data storage unit that stores therein the NC program programmed by the NC-program programming unit 15.

The machining-target-area-shape updating unit 17 receives the data on the surface-machining target-area shape from the surface-machining-target-area-shape storage unit 12 and the machining-target-area shape data from the machining-target-area-shape storage unit 6. The machining-target-area-shape updating unit 17 newly creates machining-target-area shape data based on the received data on the surface-machining target-area shape and the machining-target area shape, and updates the old machining-target-area shape data in the machining-target-area-shape storage unit 6 with the newly created machining-target-area shape data.

The CAD system 30 includes a device, such as a personal computer, that creates product shape data and material shape data. The CAD system 30 transmits the product shape data and the material shape data to the shape-data input unit 2 of the NC-program programming device 1.

Figure 2:
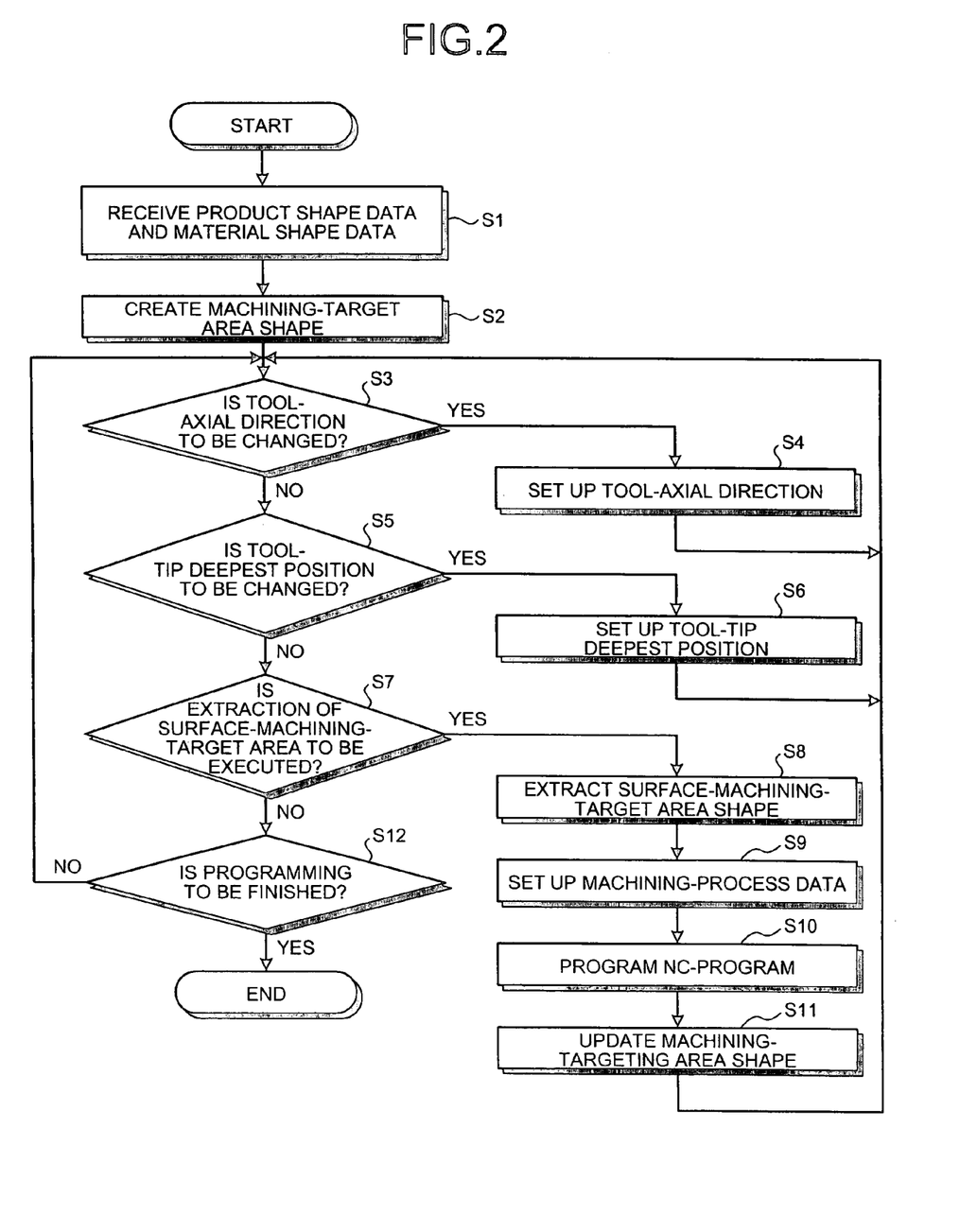
FIG. 2 is a flowchart for explaining processing procedures performed by the NC-program programming device.

Next, processing procedures performed by the NC-program programming device 1 are described. FIG. 2 is a flowchart for explaining the processing procedures performed by the NC-program programming device 1. The shape-data input unit 2 receives product shape data and the material shape data from the CAD system 30 (step S1). The shape-data input unit 2 stores the product shape data in the product-shape storage unit 3 and stores the material shape data in the material-shape storage unit 4.

The machining-target-area-shape creating unit 5 receives the product shape data and the material shape data from the product-shape storage unit 3 and the material-shape storage unit 4 respectively, and creates machining-target-area shape data (step S2). The machining-target-area-shape creating unit 5 stores the created machining-target-area shape data in the machining-target-area-shape storage unit 6.

Figure 3:
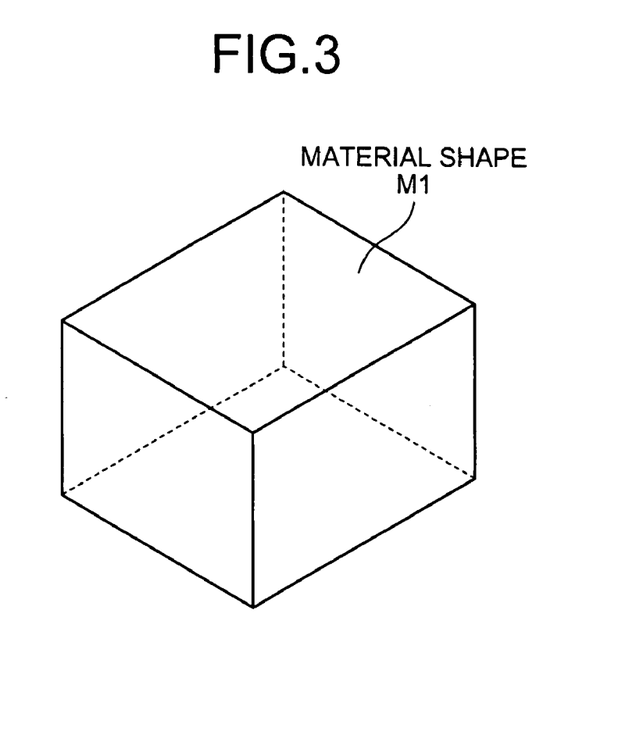
FIG. 3 is a schematic of an example of material shape data.
Figure 4:
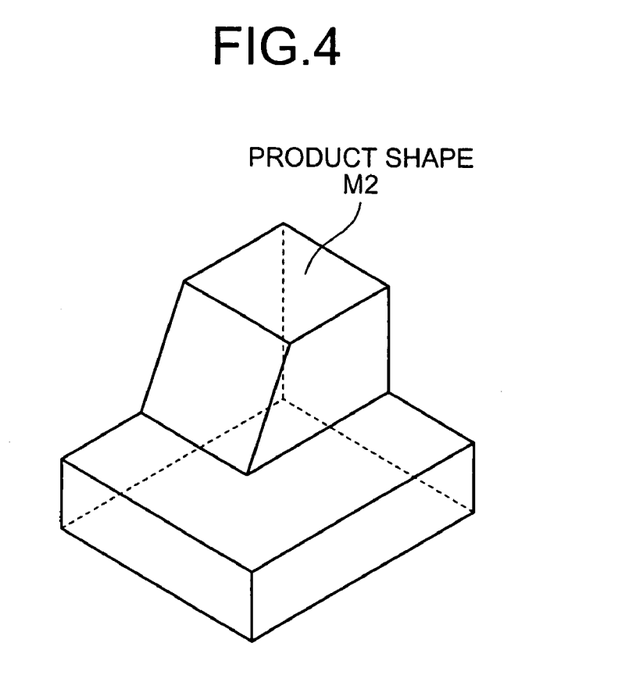
FIG. 4 is a schematic of an example of product shape data.

The material shape data, the product shape data, and the machining-target-area shape data are described in detail below. FIG. 3 is a schematic of an example of the material shape data. FIG. 4 is a schematic of an example of the product shape data.

The material shape data includes numerical data and the like that represents a material shape M1 while the product shape data includes numerical data and the like that represents a product shape M2. The material shape M1 has, for example, the shape (area) of a quadrangular prism as shown in FIG. 3.

The product shape M2 has, for example, an upper portion and a lower portion as shown in FIG. 4. The upper portion has the shape of a trapezoid prism that is formed by a triangular prism and a rectangular solid in which a side surface of the triangular prism is attached to a side surface of the rectangular solid. The lower portion has the shape of a plate-like rectangular solid. The upper portion is placed on a top surface of the lower portion such that one of the corners of the trapezoid prism is positioned to match with one of the corners of the plate-like rectangular solid.

Figure 5:
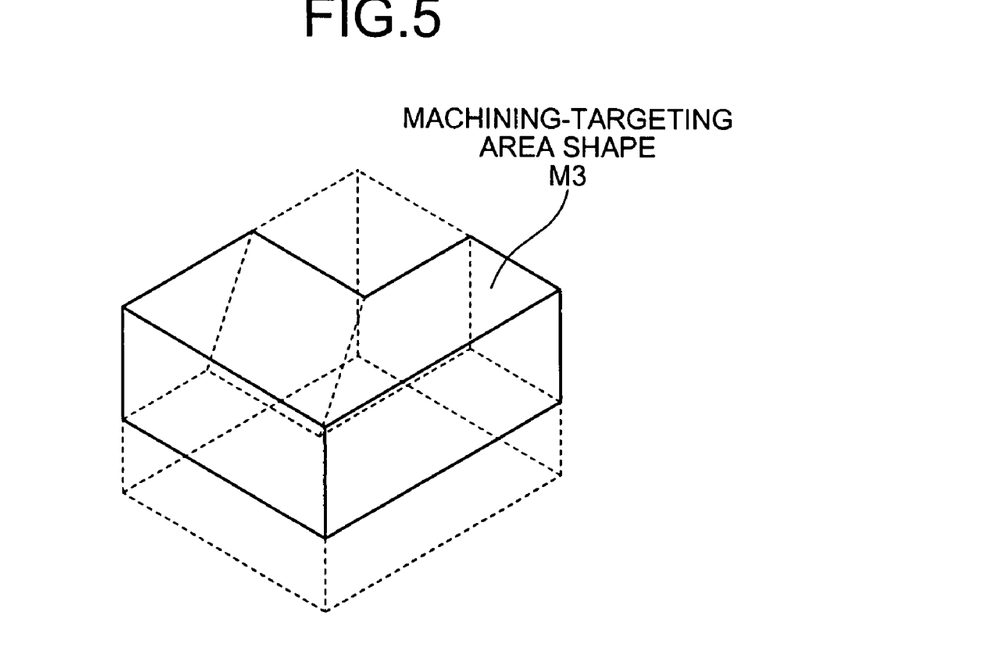
FIG. 5 is a schematic of an example of machining-target area shape data.

The machining-target-area-shape creating unit 5 creates the machining-target-area shape data from the material shape M1 and the product shape M2. FIG. 5 is a schematic of an example of the machining-target-area shape data that is created by using the material shape M1 shown in FIG. 3 and the product shape M2 shown in FIG. 4.

The machining-target-area shape data includes numerical data and the like that represents a machining-target area shape M3. As shown in FIG. 5, the machining-target area shape M3 has, for example, the shape (area) that represents a remainder when the product shape M2 is subtracted from the material shape M1 by performing a set operation.

Once the machining-target-area-shape creating unit 5 creates the machining-target-area shape data and stores the machining-target-area shape data in the machining-target-area-shape storage unit 6, the tool-axial-direction setting unit 7 checks whether the setting of the current tool-axial direction is to be changed (step S3).

If data on an instruction for changing the setting of the current tool-axial direction is included in the data on instructions received via the instruction input unit 20 (the operator), the tool-axial-direction setting unit 7 determines that the setting of the current tool-axial direction is to be changed.

If the tool-axial-direction setting unit 7 determines that the setting of the current tool-axial direction is to be changed (YES at step S3), the shape selecting unit 18 in the tool-axial-direction setting unit 7 extracts data on a part such as a surface or a line from the product shape data to determine a tool-axial direction based on the product shape data stored in the product-shape storage unit 3 and data on an instruction from the instruction input unit 20 (a specification of a surface or a line for determining the tool-axial direction) (a first specifying data). The shape selecting unit 18 inputs the extracted data to the tool-axial-direction selecting unit 19 as the product-shape part data.

The tool-axial-direction selecting unit 19 determines a tentative tool-axial direction (a prospective tool-axial direction) from the product-shape part data received from the shape selecting unit 18. The tool-axial-direction selecting unit 19 determines a tool-axial direction after determining whether an instruction for changing the tool-axial direction has been received from the operator (an instruction whether the tool-axial direction is to be reversed). In other words, the tool-axial-direction setting unit 7 selects a surface or a line from the product shape data depending on an instruction from the operator, and sets a direction corresponding to the selected surface or line as the current tool-axial direction (step S4). Then, the tool-axial-direction setting unit 7 stores data on the determined tool-axial direction in the tool-axial-direction storage unit 8.

Figure 6:
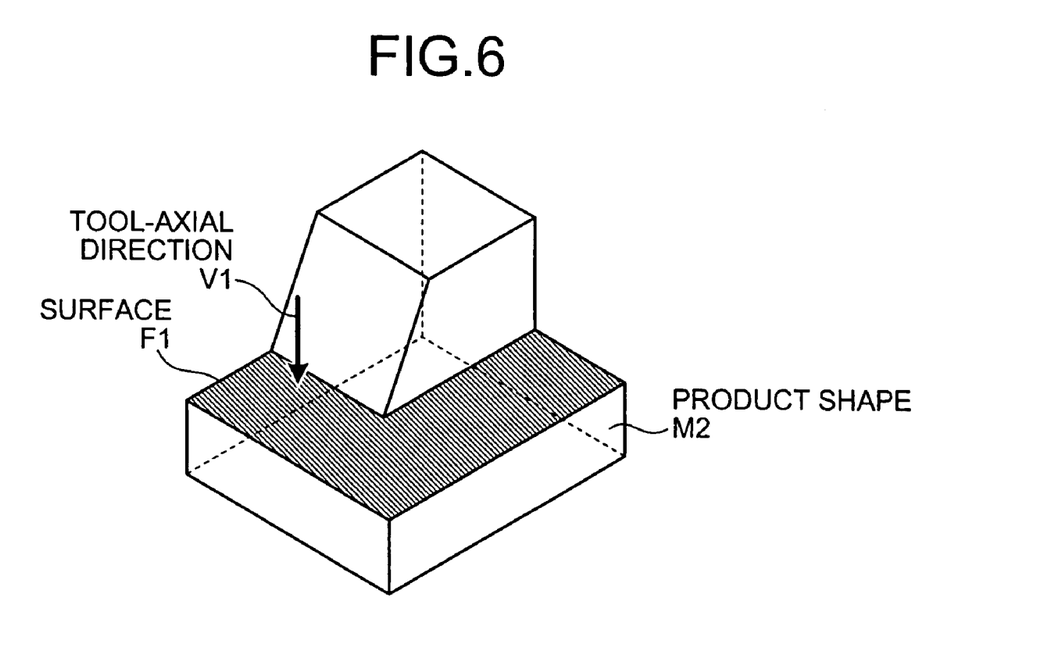
FIG. 6 is a first schematic for explaining an example of initial setting of an axial direction of a tool.
Figure 7:
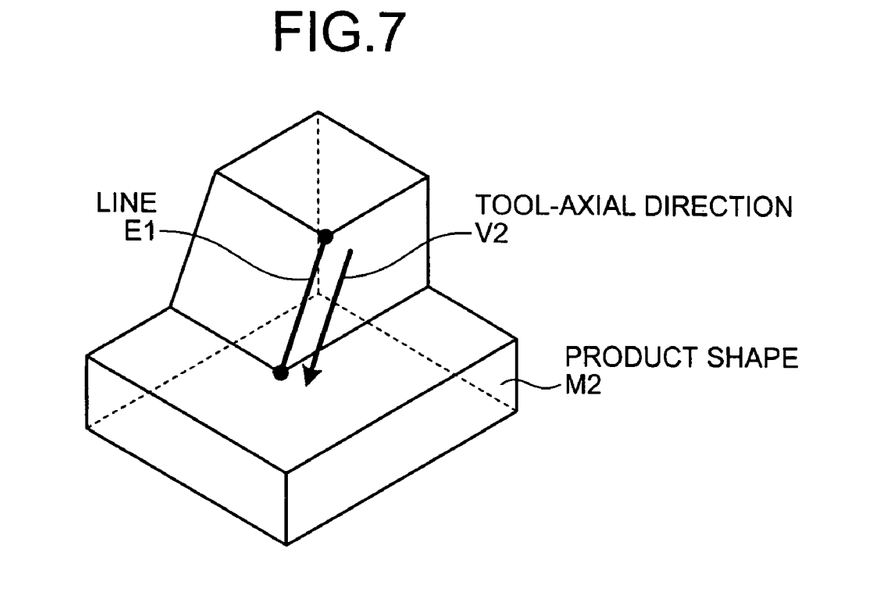
FIG. 7 is a second schematic for explaining an example of initial setting of the axial direction of the tool.

The selected surface and line, and the tool-axial direction that is determined based on the selected surface and line are described below. FIGS. 6 and 7 are schematics for explaining examples setting of the tool-axial direction. FIG. 6 depicts an example when a surface F1 of the product shape M2 is selected based on an instruction from the operator. The surface F1 is a portion of the top surface of the lower portion shown in FIG. 4 that does not contact with the upper portion. The tool-axial-direction setting unit 7 sets a tool-axial direction V1, which is a direction normal to the surface F1, as a direction corresponding to the surface F1.

FIG. 7 depicts an example when a line E1 of the product shape M2 is selected based on an instruction from the operator. The line E1 is a side of the upper portion shown in FIG. 4. The line E1 is also the base of the trapezoid prism (the triangular prism) that obliquely contacts with the top surface of the lower portion. The tool-axial-direction setting unit 7 sets a tool-axial direction V2, which is a direction parallel (tangential) to the line E1, as a direction corresponding to the line E1.

After setting the tool-axial directions, the tool-axial-direction setting unit 7 further checks whether the setting of the tool-axial direction is to be changed (step S3). If the tool-axial-direction setting unit 7 determines not to change the setting of the current tool-axial direction (no instruction for changing the setting from the operator) (NO at step S3), the tool-tip-deepest-position setting unit 9 checks whether the setting of the current tool-tip deepest position is to be changed (step S5).

If data on an instruction for changing the setting of the current tool-tip deepest position is included in the data on instructions received from the instruction input unit 20 (the operator), the tool-tip-deepest-position setting unit 9 determines that the setting of the current tool-tip deepest position is to be changed.

If the tool-tip-deepest-position setting unit 9 determines that the setting of the current tool-tip deepest position is to be changed (YES at step S5), the tool-tip-deepest-position setting unit 9 determines a new tool-tip deepest position based on the product shape data stored in the product-shape storage unit 3 and the data on instructions received from the instruction input unit 20 (a specification of a point on the product shape) (a second specifying data). Specifically, the tool-tip-deepest-position setting unit 9 selects a point on a surface of the product from the product shape data based on an instruction from the operator, and sets the selected point as a point that defines a surface corresponding to the deepest position of the tool tip in the surface-machining-target area (step S6). The tool-tip-deepest-position setting unit 9 stores data on the determined tool-tip deepest position in the tool-tip-deepest-position storage unit 10.

Figure 8:
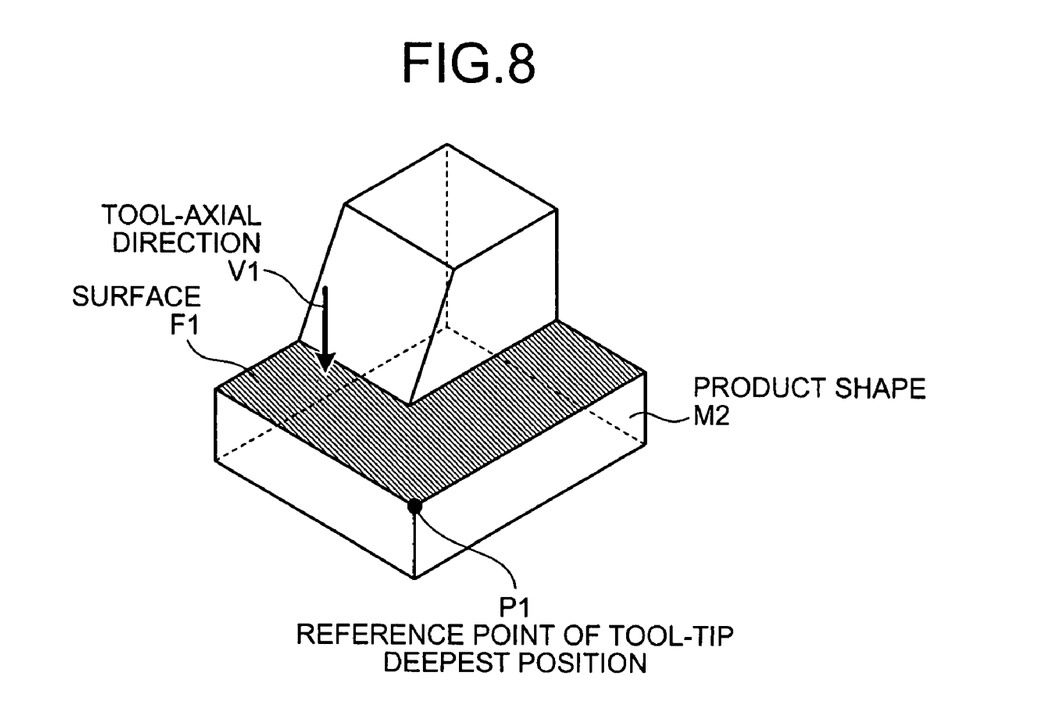
FIG. 8 depicts an example of a deepest position of a tip of the tool.

The tool-tip deepest position is explained below. FIG. 8 is a schematic of an example of the tool-tip deepest position. In the example shown in FIG. 8, a reference point P1 is selected on the product shape M2 as a reference for determining the tool-tip deepest position. A surface that is perpendicular to the tool-axial direction V1 and that includes the reference point P1 becomes a surface on which the tool-tip deepest position is located. The reference point P1 that defines the tool-tip deepest position is one of the vertexes of the lower portion shown in FIG. 4 that is located on the top surface of the lower portion, and located opposite to the other vertex of the top surface on which the upper portion contacts with the lower portion.

If the tool-tip-deepest-position setting unit 9 determines not to change the setting of the current tool-tip deepest position (completion of changing all the settings) (NO at step S5), the surface-machining-target-area-shape extracting unit 11 checks whether an extraction of a surface-machining target-area shape is to be executed (step S7). If data on the tool-tip deepest position is stored in the tool-tip-deepest-position storage unit 10, the surface-machining-target-area-shape extracting unit 11 determines that the extraction of the surface-machining target-area shape is to be executed.

If the surface-machining-target-area-shape extracting unit 11 determines that the extraction of the surface-machining target-area shape is to be executed (YES at step S7), the surface-machining-target-area-shape extracting unit 11 receives the product shape data from the product-shape storage unit 3 and the machining-target-area shape data from the machining-target-area-shape storage unit 6. Furthermore, the surface-machining-target-area-shape extracting unit 11 receives the tool-axial direction data from the tool-axial-direction storage unit 8 and the tool-tip deepest position data from the tool-tip-deepest-position storage unit 10.

The surface-machining-target-area-shape extracting unit 11 extracts the surface-machining target-area shape by using the data received from the product-shape storage unit 3, the machining-target-area-shape storage unit 6, the tool-axial-direction storage unit 8, and the tool-tip-deepest-position storage unit 10 (i.e., the currently set up tool-axial direction data, tool-tip deepest position data, product shape data, machining-target area shape data).

Processes for extracting the surface-machining target-area shape are described below. FIGS. 9 to 15 are diagrams for explaining the processes for extracting the surface-machining target-area shape. In the first step of the processes for extracting the surface-machining target-area shape, the surface-machining-target-area-shape extracting unit 11 extracts a part (hereinafter, "a partial product shape") of the product shape. Specifically, the surface-machining-target-area-shape extracting unit 11 extracts a partial product shape that is among the partial product shapes that are obtained when the product shape is divided by using a plane surface, which includes the reference point that defines the tool-tip deepest position and that is perpendicular to the tool-axial direction, and that is located on the opposite side of the plane surface with respect to the tool-axial direction. In the current example, the surface-machining-target-area-shape extracting unit 11 extracts the partial product shape based on the product shape data (the product shape M2), the tool-axial direction data, and the tool-tip deepest position data.

Figure 9:
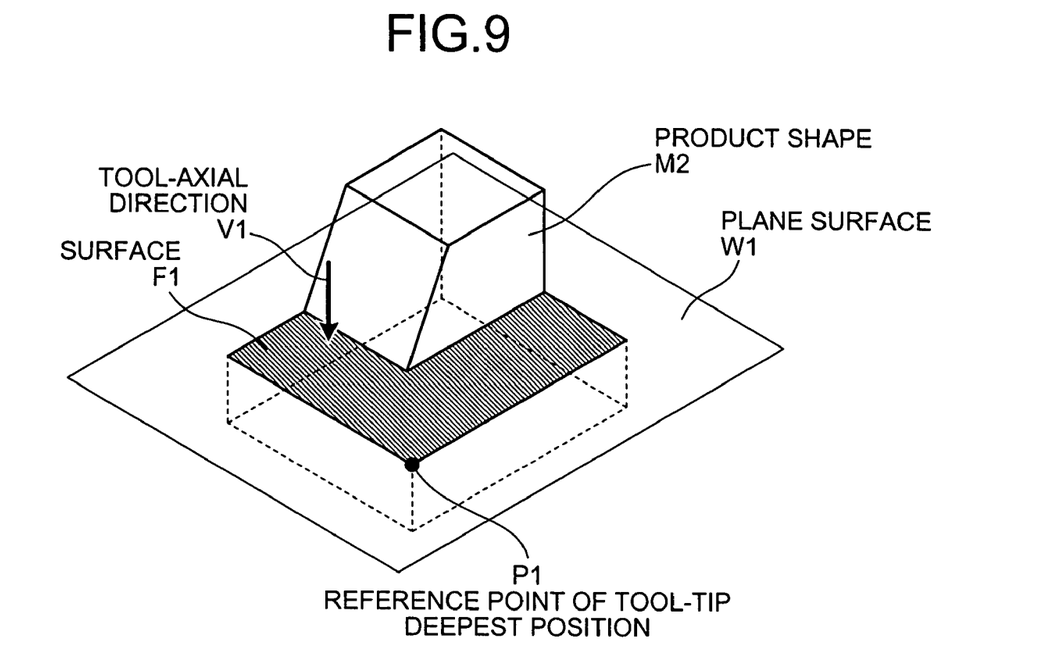
FIG. 9 is a schematic for explaining an example of a plane surface that divides the product shape.

FIG. 9 is a schematic for explaining a plane surface that divides the product shape. As shown in this figure, a plane surface W1 that divides the product shape M2 is defined by the tool-axial direction V1 and the reference point P1 that defines the tool-tip deepest position. Specifically, the plane surface W1 is perpendicular to the tool-axial direction V1 and includes the reference point P1 that defines the tool-tip deepest position. Namely, the plane surface W1 and the surface F1 belong to one plane surface.

Figure 10:
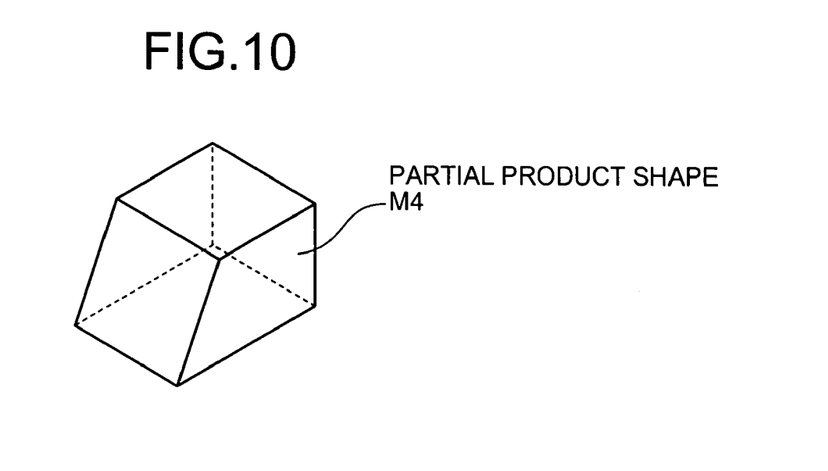
FIG. 10 is a schematic for explaining an example of a partial shape of the product that is divided by the plane surface.

FIG. 10 is a schematic for explaining a partial shape of the product that is divided by a plane surface. As shown in this figure, a partial shape (a partial product shape M4) of the product shape M2 can be extracted by extracting a partial shape of the product that is located on the opposite side, with respect to the tool-axial direction, of the plane surface W1 used for dividing. The partial product shape M4 corresponds to the product shape M2 shown in FIG. 4.

Figure 11:
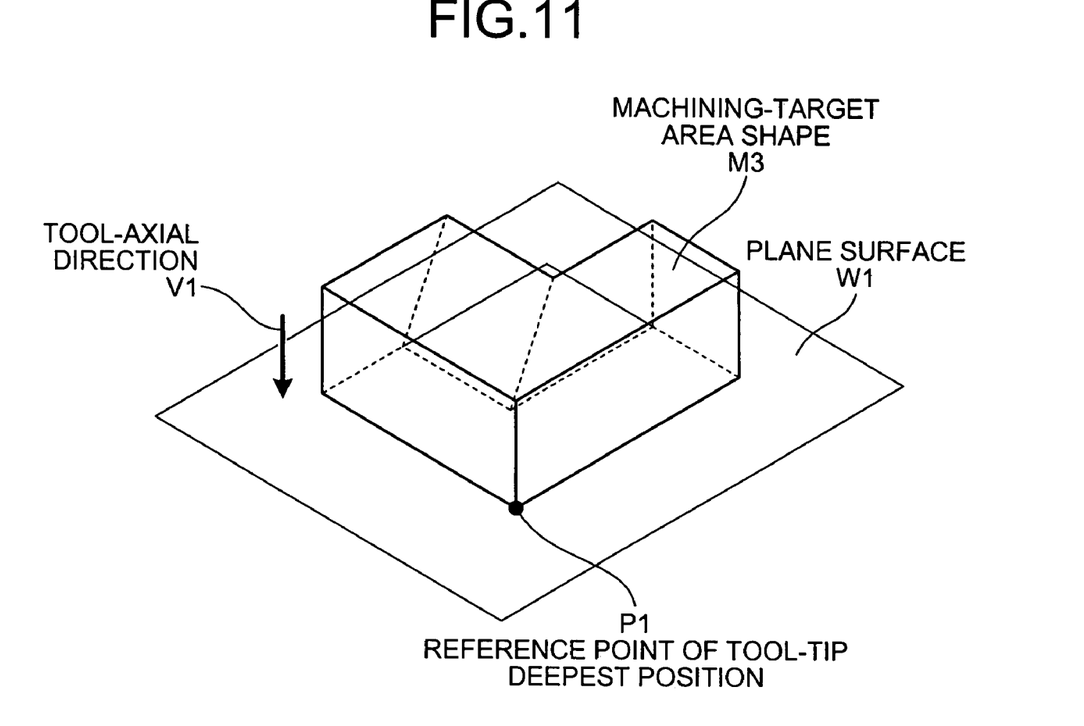
FIG. 11 is a schematic for explaining an example of a plane surface that divides the machining-target area shape.

Next, in the second step of the processes for extracting the surface-machining target-area shape, in the same manner as in the first step, the surface-machining-target-area-shape extracting unit 11 extracts a partial shape from the machining-target area shape by using a plane surface defined by the tool-axial direction and the tool-tip deepest position. Specifically, the surface-machining-target-area-shape extracting unit 11 extracts the partial shape from the machining-target area shape based on the tool-axial direction data, the data on tool-tip deepest position, and the machining-target area shape data.

FIG. 11 is a schematic for explaining a plane surface that divides the machining-target area shape. As shown in this figure, the plane surface W1 that divides a machining-target area shape M3 is defined by the tool-axial direction V1 and the reference point P1 that defines the tool-tip deepest position. Specifically, the plane surface W1 is perpendicular to the tool-axial direction V1 and includes the reference point P1 that defines the tool-tip deepest position.

Figure 12:
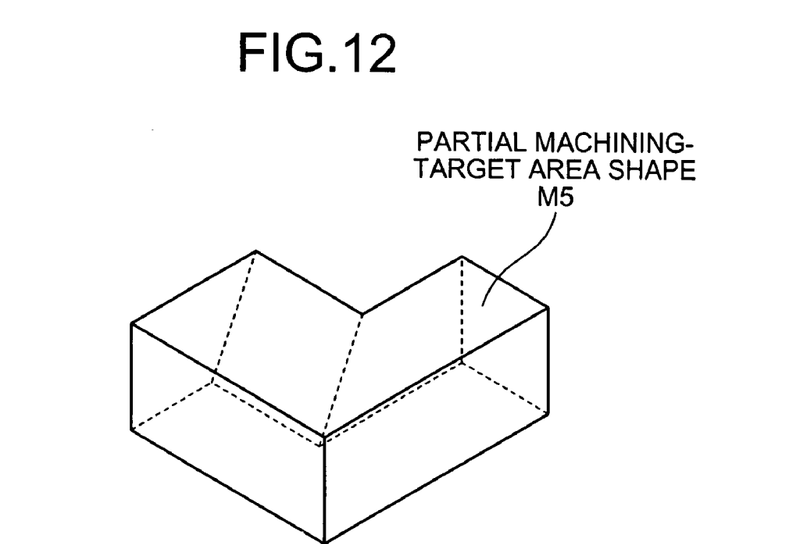
FIG. 12 is a schematic for explaining a partial shape of the machining-target area that is divided by the plane surface.

FIG. 12 is a schematic for explaining a partial shape of a machining-target area that is divided by a plane surface. As shown in this figure, a partial shape (a partial product shape M5) of the product shape M3 can be extracted by extracting a partial shape of the product that is located on the opposite side, with respect to the tool-axial direction, of the plane surface W1 used for dividing.

Figure 13:
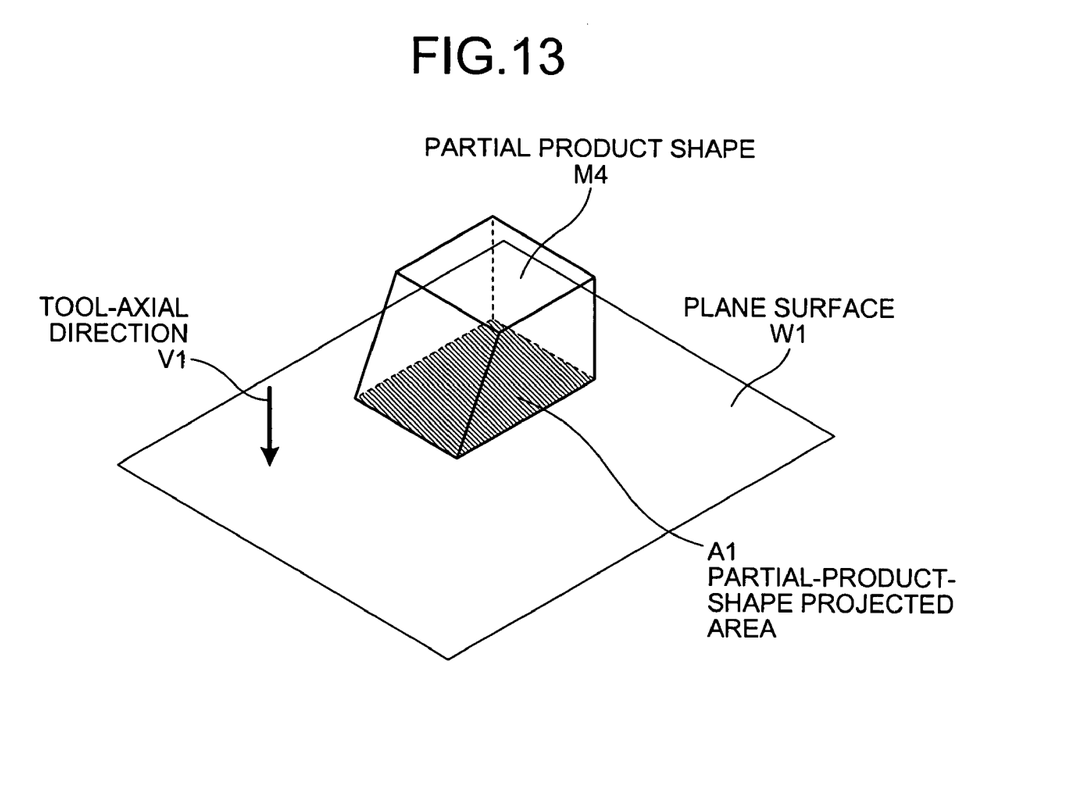
FIG. 13 is a schematic for explaining an example of a projected area of the partial shape of the product shape.

Next, in the third step of the processes for extracting the surface-machining target-area shape, the surface-machining-target-area-shape extracting unit 11 computes a projected area of the partial product shape M4 on the plane surface W1 that is defined by the tool-axial direction V1 and the reference point P1 that defines the tool-tip deepest position.

FIG. 13 is a schematic for explaining a projected area of the partial product shape. As shown in this figure, the projected area (a partial-product-shape projected area A1) of the partial product shape M4 is obtained by projecting the partial product shape M4 extracted in the first step on the plane surface W1 that is defined by the tool-axial direction V1 and the reference point P1 that defines the tool-tip deepest position.

The surface-machining-target-area-shape extracting unit 11 creates an area (a tool-interfered area) that comes in the way of the tool, for example, by sweeping the partial-product-shape projected area A1 shown in FIG. 13 in the opposite direction of the tool-axial direction V1. The tool-interfered area is an area that comes in the way of (i.e., gets machined) the tool when the tool machines the partial product shape M4 along the tool-axial direction V1.

Figure 14:
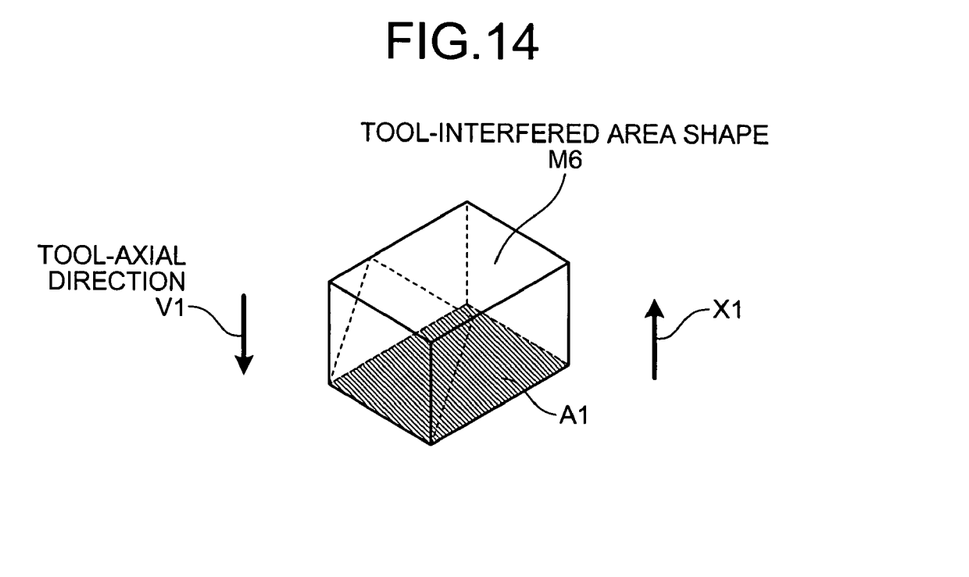
FIG. 14 is a schematic for explaining an example of an area interfered by during machining along one axial direction of the tool.

FIG. 14 is a schematic for explaining the area interfered during machining along one tool-axial direction. The surface-machining-target-area-shape extracting unit 11 creates a tool-interfered area shape M6 by sweeping the partial-product-shape projected area A1 in a direction X1 that is opposite of the tool-axial direction V1. When doing this, the surface-machining-target-area-shape extracting unit 11 creates the tool-interfered area shape M6 by sweeping the partial-product-shape projected area A1 by an amount equivalent to a height of the partial product shape M4 (in the opposite direction of the tool-axial direction V1).

Figure 15:
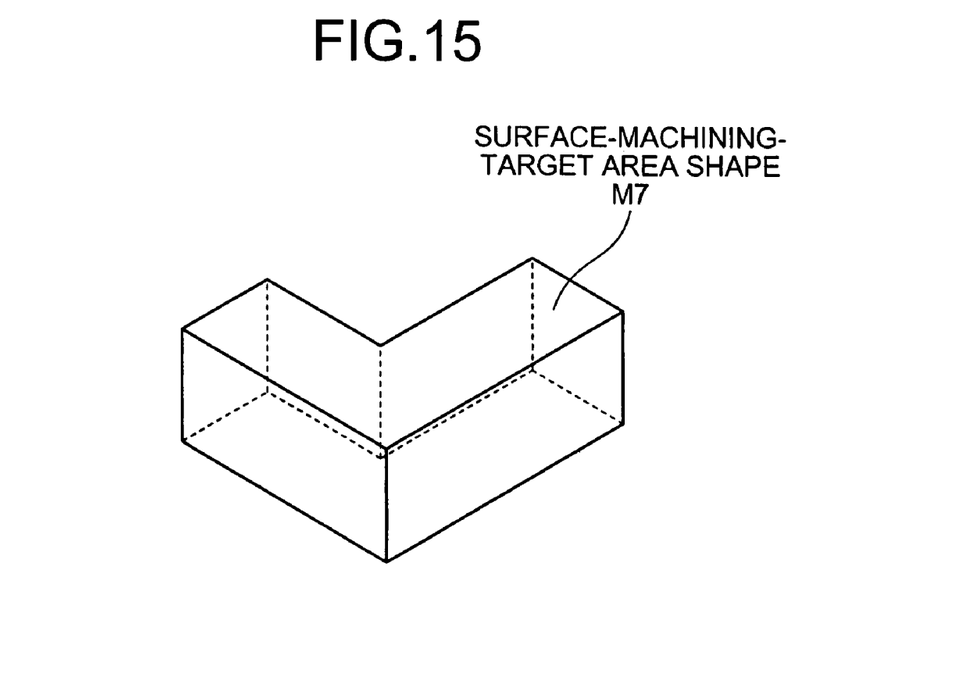
FIG. 15 is a schematic of a surface-machining target-area shape.

Next, in the fourth step of the processes for extracting the surface-machining target-area shape, the surface-machining-target-area-shape extracting unit 11 creates a surface-machining target-area shape by removing the tool-interfered area shape M6 created in the third step from the partial machining-target area shape M5 extracted in the second step.

FIG. 15 is a schematic of a surface-machining target-area shape. A surface-machining target-area shape M7 denotes an area that the tool-interfered area shape M6 created in the third step is removed from the partial machining-target area shape M5 extracted in the second step. The surface-machining target-area shape M7 is a shape that can be machined without causing interference with the product shape M2 with remaining the current tool-axial direction and the deepest position of the tool tip.

The surface-machining-target-area-shape extracting unit 11 performs the above processes for extracting the surface-machining target-area shape (in the first to fourth steps) to obtain a maximal degree of the surface-machining target-area shape M7 without causing interference with the product shape M2 with remaining the current tool-axial direction and the latest position of the tool tip (step S8). The surface-machining-target-area-shape extracting unit 11 stores data on the extracted surface-machining target-area shape as the first surface-machining target-area shape M7 in the surface-machining-target-area-shape storage unit 12.

Next, the machining-process-data determining unit 13 sets machining conditions (machining-process data) such as the tool to be used and cutting conditions when machining the surface-machining target-area shape M7 by using the shape data on the surface-machining target-area shape M7 extracted by the process at the step S8 (step S9). Incidentally, if the product-shape storage unit 3 stores therein data on, for example, roughness of a finish surface of the machining-target object (surface data) as the product shape data, the machining-process-data determining unit 13 can set up machining conditions such as a machining rate based on the surface data. The machining-process-data determining unit 13 stores the set machining-process data in the machining-process-data storage unit 14.

Next, the NC-program programming unit 15 programs an NC program based on the data on the surface-machining target-area shape stored in the surface-machining-target-area-shape storage unit 12 and the machining-process data stored in the machining-process-data storage unit 14. Namely, the NC-program programming unit 15 programs the NC program by using the data on the surface-machining target-area shape extracted by the process at the step S8 and the machining-process data determined by the process at the step S9 (step S10). The NC-program programming unit 15 stores the programmed NC program in the NC-program storage unit 16.

Next, the machining-target-area-shape updating unit 17 newly creates a machining-target area shape by removing the surface-machining target-area shape extracted by the process at the step S8 from the machining-target area shape currently-stored in the machining-target-area-shape storage unit 6. The machining-target-area-shape updating unit 17 updates the machining-target area shape stored in the machining-target-area-shape storage unit 6 by setting the newly-created machining-target area shape as the current machining-target area shape (step S11).

Figure 16:
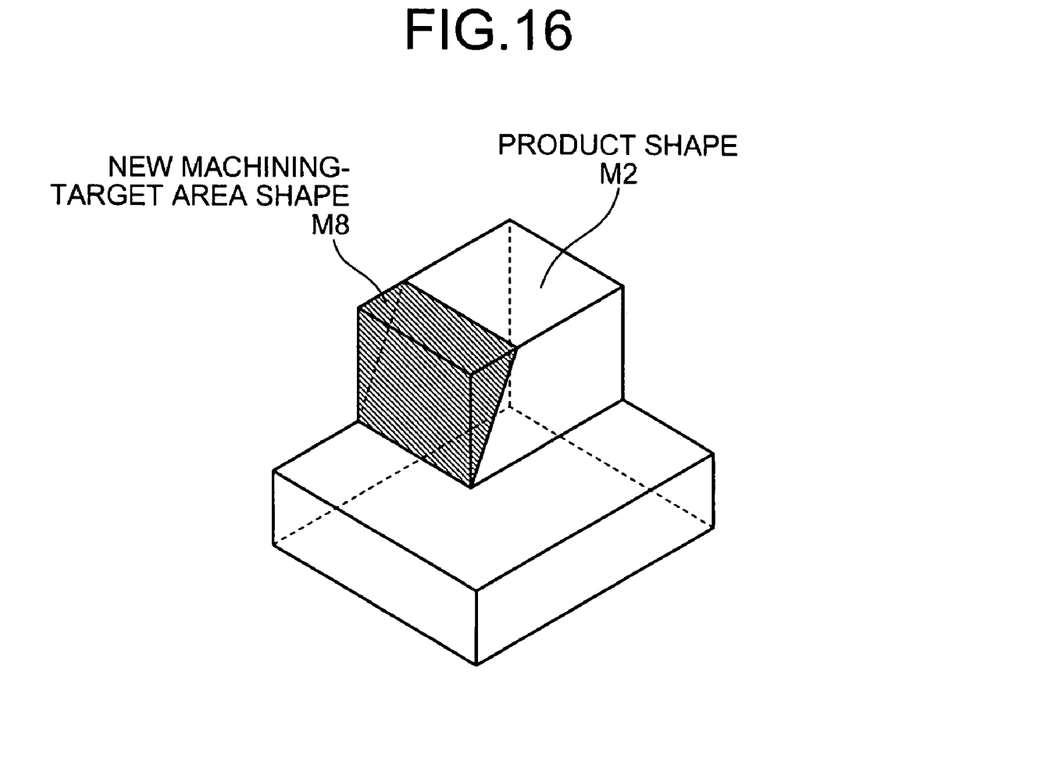
FIG. 16 is a schematic of a new machining-target area shape data that is newly obtained based on the machining-target area shape shown in FIG. 5 and the surface-machining target-area shape shown in FIG. 15.

A newly-created machining-target area shape is described below. FIG. 16 is a schematic of the new machining-target area shape that is obtained from the machining-target area shape shown in FIG. 5 and the surface-machining target-area shape shown in FIG. 15. Specifically, the new machining-target area shape (a new machining-target area shape M8) is obtained when the surface-machining target-area shape M7 shown in FIG. 15 is removed from the machining-target area shape M3 shown in FIG. 5. The new machining-target area shape M8 has the shape of a triangular prism. If the new machining-target area shape M8 is joined with the upper portion (the trapezoid prism) of the product shape M2 shown in FIG. 4, the shape of a rectangular solid is formed by the new machining-target area shape M8 and the trapezoid prism.

Next, returning to the process at the step S3, the NC-program programming device 1 repeatedly performs the processes in the steps S3 to S11 until the surface-machining-target-area-shape extracting unit 11 determines not to execute the extraction of the surface-machining target-area shape.

In the NC-program programming device 1, after the machining-target-area-shape storage unit 6 stores therein the new machining-target area shape M8, the tool-axial-direction setting unit 7 checks whether the setting of the current tool-axial direction is to be changed (step S3).

Subsequently, the NC-program programming device 1 performs the processes in the steps S3 to S11. Namely, if the tool-axial-direction setting unit 7 determines that the setting of the current tool-axial direction is to be changed (YES at step S3), the shape selecting unit 18 in the tool-axial-direction setting unit 7 extracts data on a part such as a surface or a line to determine the tool-axial direction from the product shape data based on the product shape data stored in the product-shape storage unit 3 and data on an instruction from the instruction input unit 20 (a specification of a surface or a line for determining the tool-axial direction). Then, the shape selecting unit 18 inputs the extracted data to the tool-axial-direction selecting unit 19 as the product-shape part data.

For example, if the operator gives an instruction for changing the setting of the current tool-axial direction from the tool-axial direction V1 to a different direction (the second tool-axial direction), the shape selecting unit 18 extracts data on a part such as a surface or a line to determine the tool-axial direction with respect to the product shape. The shape selecting unit 18 inputs the extracted data as second product-shape part data to the tool-axial-direction selecting unit 19.

Subsequently, the tool-axial-direction selecting unit 19 determines a tentative tool-axial direction from the product-shape part data input from the shape selecting unit 18 (step S4), and stores the data on the determined tool-axial direction in the tool-axial-direction storage unit 8.

Figure 17:
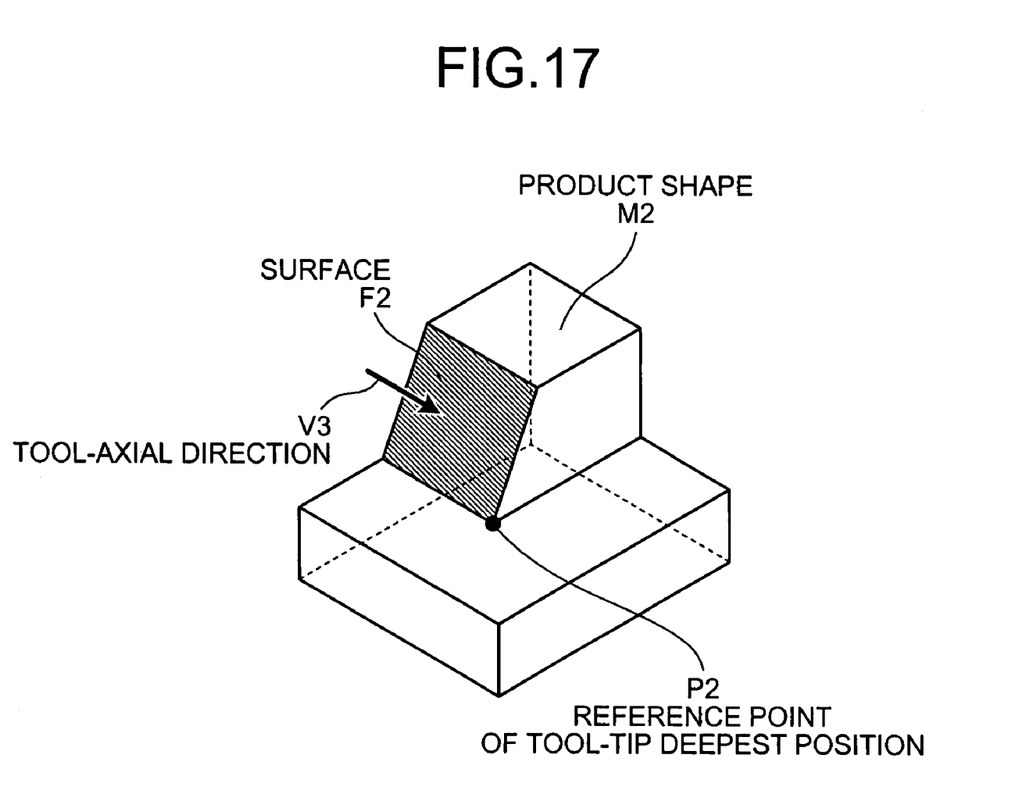
FIG. 17 is a schematic for explaining an example of an axial direction of the tool that is set up in a second operation.

A surface and a line that selected is a second operation, and a tool-axial direction that is determined based on the selected surface and line are described in detail below. FIG. 17 is a schematic for explaining an example of a tool-axial direction that is set up in the second operation.

FIG. 17 depicts a case where a surface F2 of the product shape M2 is selected by an instruction from the operator. The surface F2 is one of surfaces of the upper portion shown in FIG. 4, and abuts with the new machining-target area shape M8. In the current example, the tool-axial-direction setting unit 7 sets a tool-axial direction V3 by using a direction normal to the surface F2 as a direction corresponding to the surface F2.

After completion of the setting of the second tool-axial direction V3, if the tool-axial-direction setting unit 7 determines that the (current) tool-axial direction is not to be changed (NO at step S3), the tool-tip-deepest-position setting unit 9 checks whether the setting of the current tool-tip deepest position is to be changed (step S5).

If the tool-tip-deepest-position setting unit 9 determines that the setting of the current tool-tip deepest position is to be changed (YES at step S5), the tool-tip-deepest-position setting unit 9 determines the second tool-tip deepest position based on the product shape data stored in the product-shape storage unit 3 and the data on an instruction from the instruction input unit 20 (a specification of a point on the product shape) (step S6). The tool-tip-deepest-position setting unit 9 stores data on the determined tool-tip deepest position in the tool-tip-deepest-position storage unit 10.

As shown in FIG. 17, a reference point P2 that defines the tool-tip deepest position is selected on the product shape M2. The surface that is perpendicular to the tool-axial direction V3 and includes the reference point P2 is the surface that includes the tool-tip deepest position. The reference point P2 that defines the tool-tip deepest position is one of the vertexes located on a bottom surface of the trapezoid prism and it is also located on a surface on which the upper portion contacts with the lower portion.

In the situation that the second tool-tip deepest position has been fixed, if the tool-tip-deepest-position setting unit 9 determines that the setting of the second tool-tip deepest position is not to be changed (NO at step S5), the surface-machining-target-area-shape extracting unit 11 checks whether an extraction of a second (new) surface-machining-target area is to be executed (step S7).

If the surface-machining-target-area-shape extracting unit 11 determines that the extraction of the surface-machining-target area is to be executed (YES at step S7), the surface-machining-target-area-shape extracting unit 11 receives the product shape data from the product-shape storage unit 3 and the machining-target-area shape data from the machining-target-area-shape storage unit 6. Furthermore, the surface-machining-target-area-shape extracting unit 11 receives the data on the second tool-axial direction from the tool-axial-direction storage unit 8 and the data on the second tool-tip deepest position from the tool-tip-deepest-position storage unit 10.

The surface-machining-target-area-shape extracting unit 11 extracts the second surface-machining target-area shape by using the data received from the product-shape storage unit 3, the machining-target-area-shape storage unit 6, the tool-axial-direction storage unit 8, and the tool-tip-deepest-position storage unit 10 (the currently set up tool-axial direction V3, and the second tool-tip deepest position, the product shape M2, and the new machining-target area shape M8).

The surface-machining-target-area-shape extracting unit 11 performs processes (i.e., the first to fourth steps) that are identical to the processes shown in FIGS. 9 to 15 as the processes for extracting the second surface-machining target-area shape. Namely, the surface-machining-target-area-shape extracting unit 11 extracts a partial product shape as the first step of the processes for extracting the surface-machining target-area shape. The partial product shape is extracted in such a manner that the product shape is divided by a plane surface that is perpendicular to the tool-axial direction V3 and includes the reference point P2 that defines the tool-tip deepest position. In the current example, there is no partial product shape that is located above the plane surface used to divide the product shape in the opposite direction of the tool-axial direction.

Next, in the second step of the processes for extracting the surface-machining target-area shape, the surface-machining-target-area-shape extracting unit 11 extracts a partial shape of the machining-target area shape (a partial machining-target area shape).

In this case, a partial shape of the new machining-target area shape M8 (the same shape as the new machining-target area shape M8) is extracted by using the plane surface defined by the tool-axial direction V3 and the reference point P2 defined by the tool-tip deepest position.

Next, in the third step of the processes for extracting the surface-machining target-area shape, the surface-machining-target-area-shape extracting unit 11 computes a projected area of the partial product shape on the plane surface W1 that is defined by the tool-axial direction V3 and the reference point P2 that defines the tool-tip deepest position. In the current example, there is no projected area of the partial product shape, because there is no partial product shape. Accordingly, there is no tool-interfered area. Then, in the fourth step of the processes for extracting the surface-machining target-area shape, the surface-machining-target-area-shape extracting unit 11 creates a new surface-machining target-area shape. In this case, the partial machining-target area shape is regarded as the new surface-machining target-area shape, because there is no tool-interfered area shape.

Figure 18:
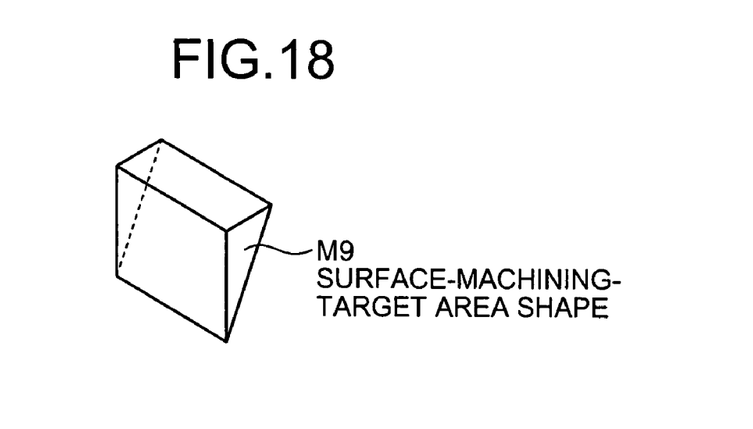
FIG. 18 is a schematic of the new surface-machining target-area shape.

FIG. 18 is a schematic of a new surface-machining target-area shape. The new surface-machining target-area shape M9 has the same shape as the new machining-target area shape M8. The surface-machining-target-area-shape extracting unit 11 performs the processes (i.e., the first to fourth steps) for extracting the surface-machining target-area shape, so that the second surface-machining target-area shape M9 can be obtained (step S8). The surface-machining-target-area-shape extracting unit 11 stores data on the extracted second surface-machining target-area shape as data on the new surface-machining target-area shape in the surface-machining-target-area-shape storage unit 12.

Next, the machining-process-data determining unit 13 sets machining-process data such as the tool to be used and cutting conditions when machining the surface-machining target-area shape M9 based on the shape data on the second surface-machining target-area shape M9 that is extracted by the process at the step S8 (step S9). The machining-process-data determining unit 13 stores the determined machining-process data in the machining-process-data storage unit 14.

Next, the NC-program programming unit 15 programs an NC program by using the data on the second surface-machining target-area shape stored in the surface-machining-target-area-shape storage unit 12 and the machining-process data stored in the machining-process-data storage unit 14 (step S10). The NC-program programming unit 15 stores the programmed NC program in the NC-program storage unit 16.

Next, the machining-target-area-shape updating unit 17 creates a new machining-target area shape by removing the new surface-machining target-area shape extracted by the process at the step S8 from the current machining-target area shape. In the current example, after extraction of the new surface-machining target-area shape M9, there exists no machining-target shape. Therefore, the NC-program programming device 1 performs the processes returning back to the step S3 without updating the machining-target area shape.

Then, if the surface-machining-target-area-shape extracting unit 11 determines that the extraction of the surface-machining target-area shape is not to be executed, the NC-program programming device 1 checks whether the programming for surface machining is to be finished (step S12). If the programming for surface machining is not to be finished (NO at step S12), the NC-program programming device 1 performs the processes returning back to the step S3. In this case, there is no new machining-target area shape. Therefore, the NC-program programming device 1 finishes programming for surface machining (YES at step S12).

Incidentally, a configuration has been explained above where the NC-program programming device 1 is connected to the CAD system 30. Alternatively, the shape data (the product shape data and the material shape data) included in the CAD system 30 can be input to the NC-program programming device 1 by employing a recording medium such as an FD (flexible disk) or a CD (compact disk).

As described above, according to the embodiment, the operator gives instructions for the tool-axial direction for surface machining of the product shape and the tool-tip deepest position, so that a maximal degree of the machinable surface-machining-target area can be automatically extracted without causing interference with machining of the product. Namely, a machining-target area can be easily set up with fewer instructions from the operator, and also the product can be machined without futile surface-machining. Therefore, it is possible not only to reduce the workload of the programming but also to avoid processing such as adding shapes defining the surface-machining-target area. Thus, the operator can perform programming without using high-level technical skills.

INDUSTRIAL APPLICABILITY

As described above, the programming device and the programming method according to the present invention are suitable for programming an NC program.

The invention claimed is:

1. A programming device that programs a machining control program that is used when a numerical control device performs machining control of a machining-target object by changing an axial direction of a tool, the programming device comprising:
    a machining-target-area data storage unit that stores therein data on a machining-target area of the machining-target object;
    a tool-axial-direction setting unit that sets an axial direction of the tool with respect to the data on the machining-target area stored in the machining-target-area data storage unit based on data input from outside when the machining-target object is to be surface-machined;
    a tool-deepest-position setting unit that sets a deepest position of a tip of the tool with respect to the data on the machining-target area stored in the machining-target-area data storage unit based on data input from outside when the machining-target object is to be surface-machined;
    a surface-machining-target-area extracting unit that extracts a surface-machining-target area of the machining-target object as data on the surface-machining-target area from the data on the machining-target area based on the axial direction of the tool set by the tool-axial-direction setting unit, the deepest position of the tip of the tool set by the tool-deepest-position setting unit, and the data on the machining-target area stored in the machining-target-area data storage unit;
    a machining-process-data determining unit that determines data on machining processes for surface-machining the machining-target object based on the data on the surface-machining-target area extracted by the surface-machining-target-area extracting unit; and
    a programming unit that programs a machining control program that complies with the data on the surface-machining-target area extracted by the surface-machining-target-area extracting unit and the data on the machining processes determined by the machining-process-data determining unit, wherein
    the surface-machining-target-area extracting unit extracts a maximal area that can be machined without causing interference with the machining-target object as the data on the surface-machining-target area when the machining-target object is surface-machined to the deepest position of the tip of the tool set by the tool-deepest-position setting unit in the axial direction of the tool set by the tool-axial-direction setting unit.

2. The programming device according to claim 1, further comprising a computing unit that computes the data on the machining-target area based on shape data on a final product after the machining-target object is machined and shape data on a material before the machining-target object is machined, wherein
    the machining-target-area data storage unit stores therein the data on the machining-target area computed by the computing unit.

3. The programming device according to claim 1, further comprising a machining-target-area updating unit that creates data on a new machining-target area by removing a machining-target area corresponding to the data on the surface-machining-target area extracted by the surface-machining-target-area extracting unit from a machining-target area corresponding to the data on the machining-target area stored in the machining-target-area data storage unit, and updates the data on the machining-target area to the created data on the new machining-target area as current data on the machining-target area, and then stores the updated data on the machining-target area in the machining-target-area data storage unit.

4. The programming device according to claim 2, wherein
    the data input from outside includes first specifying data that specifies a surface or a line of the product, and
    the tool-axial-direction setting unit includes
        a shape selecting unit that selects a surface or a line that complies with the first specifying data from the data on the machining-target area; and
        a tool-axial-direction selecting unit that selects
            if the shape selecting unit selects a surface, a direction vertical or parallel to the selected surface as the axial direction of the tool, and
            if the shape selecting unit selects a line, a direction tangent to the selected line as the axial direction of the tool.

5. The programming device according to claim 2, wherein
    the data input from outside includes second specifying data that specifies a point on a surface of the product, and
    the tool-deepest-position setting unit sets the deepest position of the tip of the tool that complies with the second specifying data.

6. A programming method of programming a machining control program that is used when a numerical control device performs machining control of a machining-target object by changing an axial direction of a tool, the programming method comprising:
    a machining-target-area data storage step of storing data on a machining-target area of the machining-target object;
    a tool-axial-direction setting step of setting an axial direction of the tool with respect to the data on the machining-target area stored at the machining-target-area data storage step based on data input from outside when the machining-target object is to be surface-machined;
    a tool-deepest-position setting step of setting a deepest position of a tip of the tool with respect to the data on the machining-target area stored at the machining-target-area data storage step based on data input from outside when the machining-target object is to be surface-machined;
    a surface-machining-target-area extracting step of extracting a surface-machining-target area of the machining-target object as data on the surface-machining-target area from the data on the machining-target area based on the axial direction of the tool set at the tool-axial-direction setting step, the deepest position of the tip of the tool set at the tool-deepest-position setting step, and the data on the machining-target area stored at the machining-target-area data storage step;
    a machining-process-data determining step of determining data on machining processes for surface-machining the machining-target object based on the data on the surface-machining-target area extracted at the surface-machining-target-area extracting step; and
    a programming step of programming a machining control program that complies with the data on the surfacemachining-target area extracted at the surface-machining-target-area extracting step and the data on the machining processes determined at the machining-process-data determining step, wherein the surface-machining-target-area extracting step includes extracting a maximal area that can be machined without causing interference with the machining-target object as the data on the surface-machining-target area when the machining-target object is surface-machined to the deepest position of the tip of the tool set at the tool-deepest-position setting step in the axial direction of the tool set at the tool-axial-direction setting step.

* * * * *